US012704148B2

(12) United States Patent
Jolly et al.

(10) Patent No.: US 12,704,148 B2
(45) Date of Patent: Aug. 11, 2026

(54) PIVOT CHANNEL NUT DEVICE

(71) Applicant: ABB Schweiz AG, Baden (CH)

(72) Inventors: Kevin Jolly, Memphis, TN (US); Marcus Jones, Memphis, TN (US)

(73) Assignee: ABB SCHWEIZ AG, Baden (CH)

( * ) Notice: Subject to any disclaimer, the term of this patent is extended or adjusted under 35 U.S.C. 154(b) by 477 days.

(21) Appl. No.: 18/183,637

(22) Filed: Mar. 14, 2023

(65) Prior Publication Data

US 2024/0309908 A1 Sep. 19, 2024

(51) Int. Cl.
*F16C 11/04* (2006.01)
*F16L 3/16* (2006.01)

(52) U.S. Cl.
CPC ................ *F16C 11/04* (2013.01); *F16L 3/16* (2013.01)

(58) Field of Classification Search
CPC .............. F16C 11/04; F16L 3/16; F16L 3/243
USPC ........................................ 248/324, 58, 125.2
See application file for complete search history.

(56) References Cited

U.S. PATENT DOCUMENTS 682,746 A * 9/1901 Rait .................. A47G 23/0225 248/316.1
3,167,287 A * 1/1965 Collins, Jr. .......... B65D 35/565 248/302
3,337,926 A * 8/1967 Daugherty ............... A47G 1/16 248/214
4,683,406 A * 7/1987 Ikeda ..................... G05B 19/40 901/3
5,704,571 A * 1/1998 Vargo .................... F16L 3/2431 248/68.1
6,098,942 A * 8/2000 Heath ..................... F16B 2/065 248/228.6
8,602,365 B2 * 12/2013 Neace ...................... H02G 3/32 248/692
8,714,865 B2 * 5/2014 Heath ..................... F16C 11/12 248/220.21
9,458,952 B2 * 10/2016 Zhang ....................... F16L 3/10
9,574,589 B2 * 2/2017 Knutson .............. F16M 13/027
9,845,606 B2 * 12/2017 Chilton ............... E04H 17/1447
10,302,249 B1 * 5/2019 Kelly ....................... B25H 1/04
11,638,985 B2 * 5/2023 Brooks .................. B25B 5/145 269/148
12,000,510 B2 * 6/2024 Pruitt ........................ F16L 3/24
2008/0258461 A1 * 10/2008 Heath ..................... F16C 11/04 285/190
2011/0243685 A1 * 10/2011 Mazur .................. F16B 37/043 411/103

(Continued)

*Primary Examiner* — Muhammad Ijaz
(74) *Attorney, Agent, or Firm* — Greenberg Traurig, LLP

(57) ABSTRACT

A device may include a pivot nut including a first bore, a first pivot member, a second pivot member opposite the first pivot member, and one or more embossments. The first pivot member and the second pivot member define a pivot axis. A device may include a retainer including a first portion, a second portion, a central portion, a first groove at the first portion, and a second groove at the second portion. The first portion and the second portion perpendicularly extend from opposing sides of the central portion in a common direction. The first pivot member extends into the first groove and the second pivot member extends into the second groove and the pivot nut is configured to move about the pivot axis to move the first bore between a first horizontally aligned position and a second vertically aligned position.

19 Claims, 12 Drawing Sheets

(56) References Cited

U.S. PATENT DOCUMENTS

2012/0061527 A1* 3/2012 Spies ...................... B66C 13/12 248/58
2013/0020447 A1* 1/2013 Heath ..................... F16B 2/065 248/58
2014/0097315 A1* 4/2014 Korcz .................. F16M 13/027 248/343
2015/0316085 A1* 11/2015 Zhang ................... F16B 7/0473 248/222.11
2015/0316177 A1* 11/2015 Knutson ................... F16B 7/04 248/59
2016/0281769 A1* 9/2016 Kechely .................. F16C 11/04
2017/0204995 A1* 7/2017 Leng ........................ H02G 3/32
2017/0209329 A1* 7/2017 Ishibashi ................ A61H 1/024
2018/0031149 A1* 2/2018 Van Der Mik ......... F16L 3/243
2019/0137009 A1* 5/2019 Schickling .............. F16B 2/241
2020/0041044 A1* 2/2020 Naugler ................ F16B 5/0685
2020/0091643 A1* 3/2020 Smith ..................... F16L 3/243
2020/0346576 A1* 11/2020 Maners ................... F16C 11/04
2020/0370575 A1* 11/2020 Lin ......................... B60P 7/083
2021/0207742 A1* 7/2021 Dickinson ............. F16B 37/045
2023/0408008 A1* 12/2023 Bourne ................... F16L 23/06
2024/0309908 A1* 9/2024 Jolly ....................... F16C 11/04
2024/0328539 A1* 10/2024 Artigues ................. F16L 3/127
2025/0164038 A1* 5/2025 König ...................... F16L 3/16

* cited by examiner

PIVOT CHANNEL NUT DEVICE

FIELD

The present disclosure relates to the field of conduit hanger systems. More particularly, to a pivot channel nut device for trapeze type hanger systems.

BACKGROUND

Trapeze type support systems are generally utilized to support pipes, electrical cables, and other components from an elevated structure. For example, trapeze type support systems may support electrical cables routed through a facility. Typically, trapeze hanger systems include a coupling device that connects a horizontally aligned strut member to one or more threaded rods, the one or more threaded rods also being connected to the structure. Additionally, the strut member provides support to the pipes, electrical cables, and/or other components that traverse the strut member. Depending on various factors, the assembly and installation of traditional trapeze type support systems can be difficult and time consuming. For example, the trapeze type support system may require at least two installers to assemble and install the trapeze hanger system to the structure due to the coupling device, method of coupling the threaded rod to the strut member, and the length of the strut member, thereby increasing the costs associated with installation.

SUMMARY

In some embodiments, an assembly includes a pivot nut defined by a body, the pivot nut includes a first bore at a first side, a first pivot member at a second side, a second pivot member at a third side, and one or more embossments. The first pivot member and the second pivot member define a pivot axis. The assembly includes a retainer including a first portion, a second portion, a central portion, a first groove at the first portion, and a second groove at the second portion. The first portion and the second portion extend from opposing sides of the central portion in a common direction substantially perpendicular to the central portion. The first pivot member extends into the first groove and the second pivot member extends into the second groove and the pivot nut is configured to move about the pivot axis between a first position and a second position. The first bore is in a horizontal alignment in the first position and the first bore is in a vertical alignment in the second position.

In some embodiments, the assembly further includes a strut member including a first end, a second end, a bottom surface, a first sidewall, and a second sidewall. The first sidewall includes a first flange formed on a longitudinal side of the first sidewall opposite the bottom surface. The second sidewall includes a second flange formed on a longitudinal side of the second sidewall opposite the bottom surface. The first sidewall and the second sidewall extend from opposite sides of the bottom surface in a common direction substantially perpendicular to a direction of the bottom surface. The pivot nut and the retainer are configured to be installed into the open channel.

In some embodiments, the assembly further includes a threaded rod. The threaded rod is configured to couple to the pivot nut by engaging one or more threads at the first bore and a position of the threaded rod is adjustable in an axial direction by threading the threaded rod in a clockwise or counterclockwise direction in the first bore. The threaded rod longitudinally extends through the open channel towards an opposite end when the pivot nut is in the first position.

In some embodiments, the strut member further includes one or more slots. The one or more slots are longitudinally arranged on the bottom surface between the first end and the second end.

In some embodiments, the threaded rod is further configured to adjustably extend through the first bore and the one or more slots.

In some embodiments, the one or more embossments includes one or more first embossments at the first side. The one or more first embossments and the body of the pivot nut apply a locking force between opposing contact surfaces in the open channel when moving between the first position and the second position to retain the pivot nut in the second position.

In some embodiments, the one or more embossments further includes one or more second embossments at a fourth side. The one or more first embossments and the one or more second embossments act on opposing contact surfaces in the open channel of the strut member when moving between the first position and the second position to retain the pivot nut in the second position.

In some embodiments, the retainer further includes a first tension element and a second tension element. The first tension element is located at the first portion. The second tension element is located at the second portion. The first tension element and the second tension element are configured to apply a spring force between opposing interior surfaces of the open channel of the strut member to retain a position of the retainer and the pivot nut in a longitudinal direction in the strut member.

In some embodiments, the pivot nut further includes at least one of a third protrusion at a fifth side, and a second bore at the fifth side. The second bore extends into the body in a direction that is substantially perpendicular to the first bore and defines a socket configured to receive an elongate member operable by a user to pivot the pivot nut about the pivot axis.

In some embodiments, the retainer further includes a third groove. The third groove is located at the central portion and the third groove is configured to enable an elongate article to extend through the third groove into a socket of the pivot nut to enable the elongate article to pivot the pivot nut between the first position and the second position.

In some embodiments, the pivot nut includes a first pivot nut and a second pivot nut, the retainer includes a first retainer and a second retainer, and the threaded rod includes a first threaded rod and a second threaded rod. The first pivot nut and the first retainer are located in the open channel adjacent the first end of the strut member and the second pivot nut and the second retainer are located in the open channel adjacent the second end of the strut member. The first threaded rod is coupled to the first pivot nut and the second threaded rod is coupled to the second pivot nut, and the first threaded rod and the second threaded rod are horizontally aligned in the first position and the first threaded rod and the second threaded rod are vertically aligned in the second position.

In some embodiments, a pivot nut for use in a pivot channel assembly, the pivot nut includes a body including a first pivot member at a first side, a second pivot member at a second side, a first bore, and one or more embossments. The first bore extends through the body between the first pivot member and the second pivot member and extends in a first direction between a third side and a fourth side. The first bore includes one or more threads formed on an inner surface. The first pivot member and the second pivot member define a pivot axis and the pivot nut is configured to rotate about the pivot axis between a first position and a second position. A threaded rod is configured to couple to the pivot nut by engaging the one or more threads at the first bore and a position of the threaded rod is adjustable in an axial direction by threading the threaded rod in a clockwise or counterclockwise direction in the first bore.

In some embodiments, the pivot nut further includes at least one of a third protrusion at a fifth side, and a second bore at the fifth side. The second bore extends into the body in a direction that is substantially perpendicular to the first bore and defines a socket configured to receive an elongate member operable by a user to pivot the pivot nut about the pivot axis.

In some embodiments, the one or more embossments is configured to retain the pivot nut in the second position when the pivot nut is installed into a strut member. The first bore is in a horizontal alignment in the first position and the first bore is in a vertical alignment in the second position.

In some embodiments, the one or more embossments includes one or more first embossments at the first side. The one or more first embossments and the body of the pivot nut are configured to act on opposing interior surfaces of an open channel of the strut member to retain the pivot nut in the second position.

In some embodiments, the one or more embossments further includes one or more second embossments at the fourth side. The one or more first embossments and the one or more second embossments are configured to act on opposing interior surfaces of the open channel of the strut member to retain the pivot nut in the second position.

In some embodiments, a retainer for use in a pivot channel assembly, the retainer includes a first portion, a second portion, a central portion, a first groove, wherein the first groove is located at the first portion, a second groove, wherein the second groove is located at the second portion, and wherein the first portion and the second portion extend from opposing sides of the central portion in a common direction substantially perpendicular to the central portion. The retainer is configured to receive a pivot nut between the first portion and the second portion and the retainer is further configured to retain a position of the pivot nut in an open channel of a strut member in a longitudinal direction of the open channel.

In some embodiments, the retainer further includes a first tension element. The first tension element is located at the first portion. The retainer further includes a second tension element. The second tension element is located at the second portion. The first tension element and the second tension element are configured to apply a spring force between opposing interior surfaces of the open channel of the strut member to retain a position of the retainer in the open channel of the strut member in the longitudinal direction.

In some embodiments, the first tension element and the second tension element include at least one of: a leaf spring, and a cantilever spring.

In some embodiments, the retainer further includes a third groove. The third groove is located at the central portion and the third groove is configured to enable an elongate article to extend through the third groove into a socket of the pivot nut to enable the elongate article to pivot the pivot nut between a first position and a second position.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

The present disclosure includes various embodiments of a device, apparatus, system, or assembly for a trapeze type hanger support system. The system includes a pivot nut and a retainer for installation into an open channel defined by a strut member (e.g., framing channel) as will be further described herein. When positioned in the open channel of the strut member, the pivot nut is movable between a first position and a second position. The first position is a horizontally aligned position and the second position is a vertically aligned position. Additionally, the second position is a locked position where the pivot nut is retained in the second position.

Figure 1A:
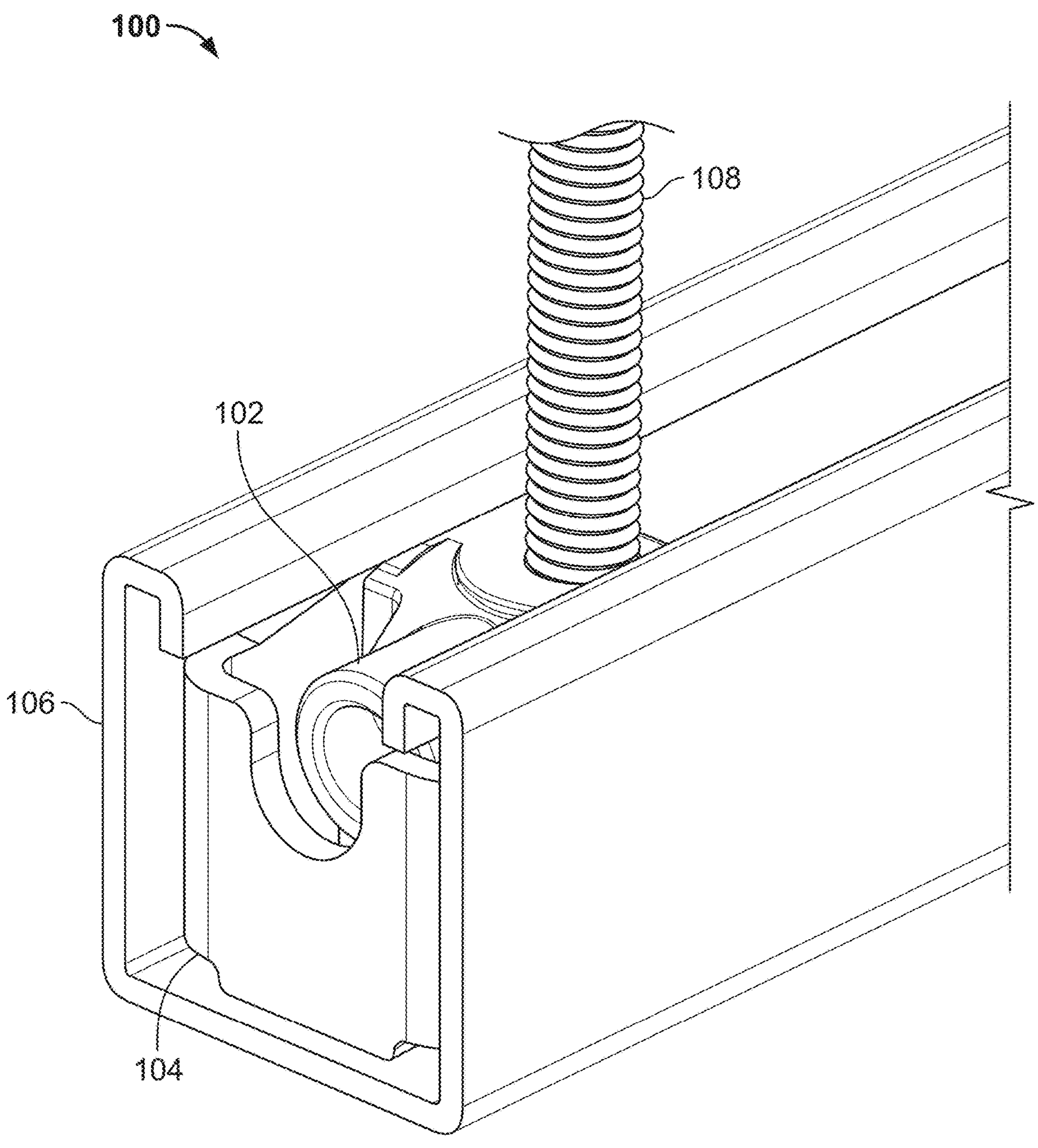
FIG. 1A illustrates a non-limiting embodiment of a system, according to some embodiments.
Figure 1B:
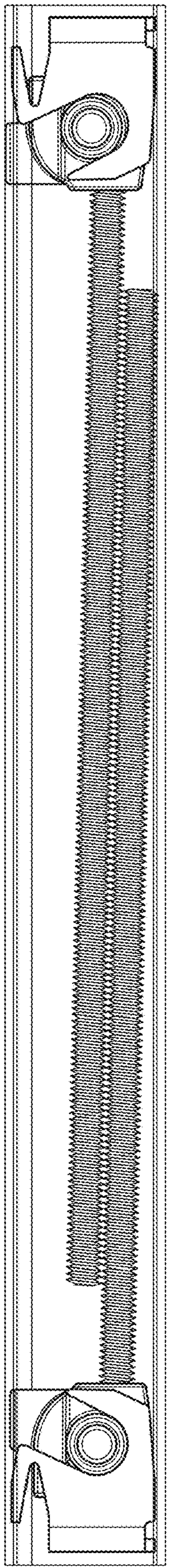
FIG. 1B illustrates a side view of the system, according to some embodiments.
Figure 1C:
FIG. 1C illustrates a second side view of the system, according to some embodiments.

FIG. 1A illustrates a perspective view of a non-limiting example of a system 100, according to some embodiments. FIG. 1B illustrates a partially exposed side view of the system 100, according to some embodiments. FIG. 1C illustrates a second partially exposed side view of the system 100, according to some embodiments. Unless specifically referenced, FIGS. 1A-1C will be described collectively.

The system 100 includes a pivot nut 102 and a retainer 104. The pivot nut 102 is configured to be installed into retainer 104 and the pivot nut 102 pivotably rotates in the retainer 104 as will be further described herein. The system may also include strut member 106. The strut member 106 serves as a framing support member for conduits, electrical cables, or the like. In some embodiments, as shown in FIG. 1A, the pivot nut 102 and retainer 104 may be configured to be installed into an end of the strut member 106. Furthermore, when installed in strut member 106, the pivot nut 102 may be positioned in the retainer 104 and the pivot nut 102 is movable between a first position and a second position as will be further described herein.

Additionally, the system 100 may also include a threaded rod 108. The threaded rod 108 may be configured to connect to pivot nut 102. The threaded rod 108 may include one or more threads formed along a longitudinal length of the threaded rod 108 and the one or more threads may engage threads of a bore located at the pivot nut 102 as will be further described herein. In some embodiments, the threaded rod 108 may be configured to extend through the pivot nut 102 and may extend through the strut member 106.

Referring to FIG. 1B, the strut member 106 includes a first end and a second end opposite the first end. The strut member 106 may include a pivot nut 102 and a retainer 104 installed at each of the first end and the second end. Furthermore, each pivot nut 102 installed into strut member 106 may be configured to be movable between the first position and the second position at each respective end of the strut member 106. As shown in FIG. 1B, each pivot nut 102 includes a threaded rod 108 attached to a respective pivot nut 102 in the first position. Further, a threaded rod 108 extends from each pivot nut 102 in a horizontal direction in the strut member 106 as a result of each pivot nut 102 being in the first position. Additionally, in some embodiments, when the pivot nut 102 is in the first position, the pivot nut 102 and the threaded rod 108 in connection with the respective pivot nut 102 may be freely movable from the first direction and towards a second direction. In some embodiments, the strut member 106 may include a first pivot nut 102' and a first retainer 104' at a first end and a second pivot nut 102" and a second retainer 104" at a second end of the strut member 106. Additionally, in some embodiments, the first pivot nut 102' may include a first threaded rod 108' in connection with the first pivot nut 102' and the second pivot nut 102" may include a second threaded rod 108" in connection with the second pivot nut 102".

The strut member 106 may include any of a plurality of lengths. For example, the strut member 106 may be 48 inches in length. Additionally, in some embodiments, a length of each threaded rod 108 in connection with each respective pivot nut 102 may be based, at least in part, on the length of the strut member 106. Accordingly, the length of the threaded rod 108 may be configured to enable each threaded rod 108 to be retained within the inner dimensions of the strut member 106 and between each pivot nut 102 when each pivot nut 102 is in the first position and the threaded rod 108 extend in a horizontal direction.

As shown in FIG. 1B, in some embodiments, the system 100 may be received by a user, the system 100 including the first pivot nut 102', the first retainer 104', and the first threaded rod 108' positioned adjacent the first end 162 and the second pivot nut 102", the second retainer 104", and the second threaded rod 108" positioned adjacent the second end 164. When received by the user, the first pivot nut 102' and the second pivot nut 102" may each be in the first position. Accordingly, the first threaded rod 108' and the second threaded rod 108" in connection with a respective first pivot nut 102' and second pivot nut 102" may be in a horizontally aligned position within an inner frame structure of strut member 106. In the horizontally aligned position, the first threaded rod 108' and the second threaded rod 108" may extend from a respective pivot nut 102 and towards the opposite pivot nut 102 located at an opposite end of the open channel 160 (FIG. 7) of the strut member 106. In some embodiments, the first threaded rod 108' may overlap with the second threaded rod 108" within the strut member 106 when each pivot nut 102 is in the first position. Accordingly, the system 100 may be shipped and delivered in a compact form factor to minimize a total dimension of the system 100 during transportation and to enable a plurality of the system 100 to be uniformly arranged on a shipping platform (e.g., pallet) in an efficient arrangement.

Referring to FIG. 1C, the first pivot nut 102' and the second pivot nut 102" may be pivoted from the first position to the second position at each respective end of strut member 106 such that the first threaded rod 108' and the second threaded rod 108" are arranged in a vertically aligned position. For example, each pivot nut 102 of the system 100 may be moved from the first position to the second position to vertically align each threaded rod 108 to enable the system 100 to be connected to a structural member. In some embodiments, the vertically aligned position may be substantially perpendicular to a direction of the strut member 106. It is to be appreciated by those having ordinary skill in the art that the length of the strut member and the threaded rods are not intended to be limiting and may include any of a plurality of lengths suitable for supporting pipes, conduits, or electrical cables, and connecting the strut member to a structural member in accordance with this disclosure.

Figure 2:
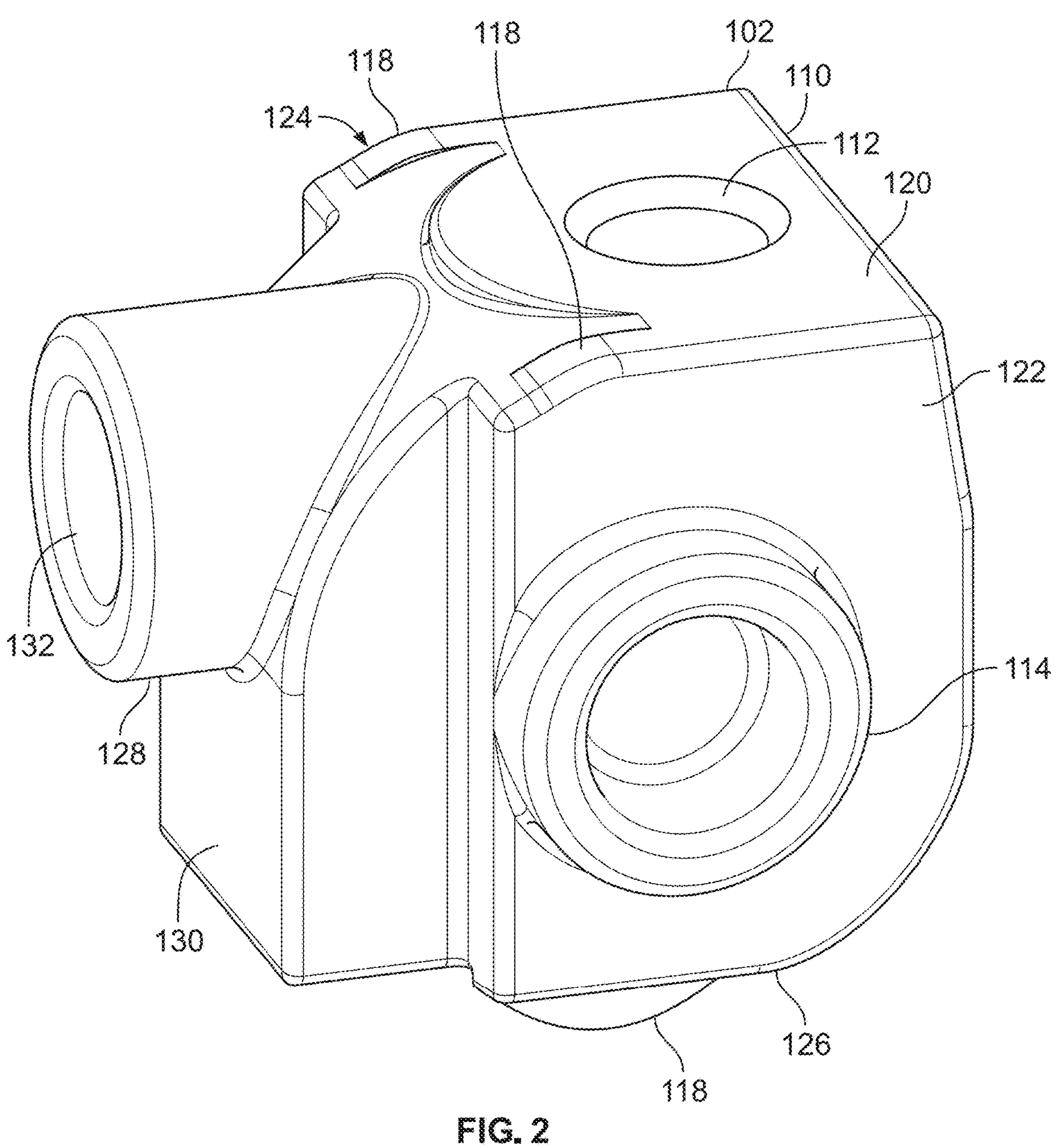
FIG. 2 illustrates a perspective view of a non-limiting example of a pivot nut, according to some embodiments.
Figure 3:
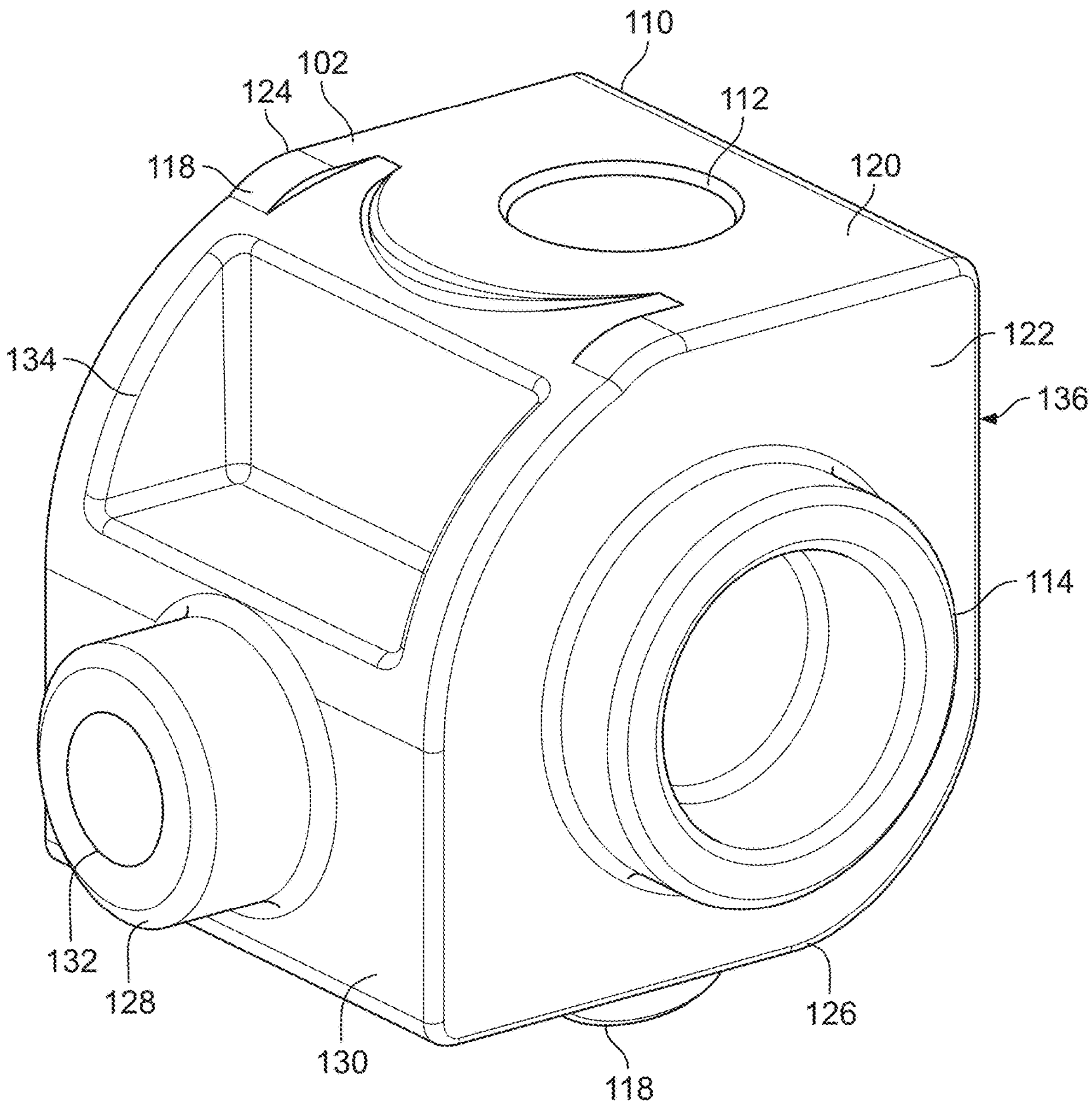
FIG. 3 illustrates a perspective view of another non-limiting example of a pivot nut, according to some embodiments.
Figure 4:
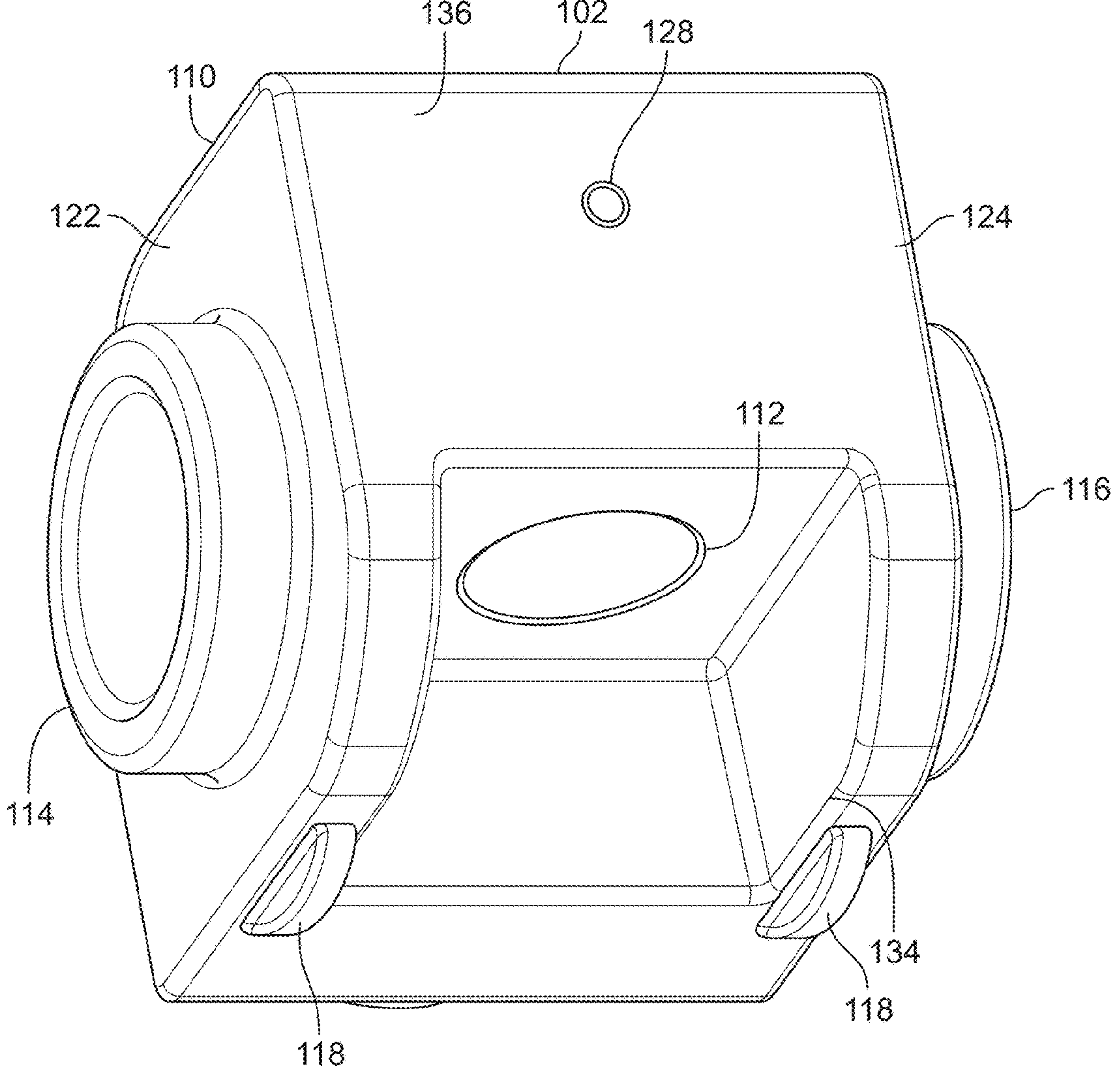
FIG. 4 illustrates a bottom perspective view of the pivot nut, according to some embodiments.

FIG. 2 illustrates a perspective view of a non-limiting example of a pivot nut 102, according to some embodiments. FIG. 3 illustrates a perspective view of a second non-limiting example of a pivot nut 102, according to some embodiments. FIG. 4 illustrates a second perspective view of the pivot nut 102 of FIG. 3, according to some embodiments. Unless specifically referenced, FIGS. 2-4 will be described collectively.

The pivot nut 102 is defined by a body 110. The pivot nut 102 includes a bore 112, a pivot member 114, a pivot member 116, and one or more embossments 118. The bore 112 is located at a first side 120 of the body 110 and extends through the body 110 opposite the first side 120. In some embodiments, the bore 112 may include a threaded inner surface to receive the threaded rod 108 as will be further described herein.

The pivot member 114 is located at a second side 122 of the body 110 and extends on a pivot axis from the body 110. The pivot member 116 is located at a third side 124 of the body 110 and extends on the pivot axis from the body 110 opposite the second side 122. Accordingly, the pivot member 114 and the pivot member 116 extend along the pivot axis. Additionally, in some embodiments, the pivot nut 102 is configured to pivot about the pivot axis. In some embodiments, the pivot nut 102 is configured to pivot between a first position and a second position as will be further described herein.

The pivot nut 102 further includes one or more embossments 118. In some embodiments, the one or more embossments 118 may be arranged at the first side 120 of the body 110. In some embodiments, the one or more embossments 118 may be arranged at a fourth side 126 of the body 110 opposite the first side 120. The one or more embossments 118 are configured to act on opposing surfaces of an open channel of the strut member 106 to retain a position of the pivot nut 102 in the strut member 106. In some embodiments, the one or more embossments 118 provides a contact force onto the opposing surfaces to retain the position of the pivot nut 102 in the strut member 106. In some embodiments, the one or more embossments 118 enables the pivot nut 102 to be retained in the second position, as will be further described herein.

Referring to FIG. 3, in some embodiments, the one or more embossments 118 arranged at the first side 120 may include one embossment. In some embodiments, the one or more embossments 118 arranged at the first side 120 may include two embossments. For example, a first embossment may be adjacent the second side 122 and a second embossment may be adjacent the third side 124. In some embodiments, the one or more embossments 118 may include three or more embossments spaced apart between the second side 122 and the third side 124.

In some embodiments, the body 110 between the first side 120 and the fifth side 130 may be substantially rounded. Accordingly, in some embodiments, the portion of the body 110 between the first side 120 and the fifth side 130 may not include an edge. Additionally, in some embodiments, the one or more embossments 118 at the first side 120 may be formed by extending along the plane of the first side 120 as the body 110 curves to form the fifth side 130.

Referring to FIG. 4, in some embodiments, the one or more embossments 118 may be arranged on the fourth side 126. The one or more embossments 118 on the fourth side 126 may protrude from a planar surface of the fourth side 126. The one or more embossments 118 at the fourth side 126 may act upon an interior surface of the strut member 106 as will be further described herein. In some embodiments, the one or more embossments 118 arranged at the fourth side 126 may include one embossment. In some embodiments, the one or more embossments 118 arranged at the fourth side 126 may include two embossments. For example, a first embossment may be adjacent the second side 122 and a second embossment may be adjacent the third side 124. In some embodiments, the one or more embossments 118 may include three or more embossments spaced apart between the second side 122 and the third side 124.

In some embodiments, the pivot nut 102 may include a cylindrical portion 128 located at a fifth side 130 of the body 110. The cylindrical portion 128 may be operated by a user to apply leverage to the pivot nut to move the pivot nut between the first position and the second position. In some embodiments, the pivot nut 102 may include a bore 132. The bore 132 defines a receptacle (e.g., socket) and is configured to receive an elongated article that may be used as a lever to apply leverage to the pivot nut 102 to enable the user to pivot the pivot nut 102 between the first position and the second position. In some embodiments, when installed into the strut member 106, the pivot nut 102 may be partially movable between the first position and the second position and the one or more embossments 118 may act against opposing surfaces of the strut member which inhibits further movement of the pivot nut 102 to the second position. Accordingly, in some embodiments, the pivot nut 102 may freely move part of the way from the first position towards the second position and an elongated article, such as a screwdriver, may be inserted into the bore 132 to be used as a lever to overcome the force provided by the one or more embossments 118 to move the pivot nut 102 into the second position. Furthermore, once in the second position, the elongated article may be inserted into the bore 132 to overcome the one or more embossments 118 retaining the pivot nut 102 in the second position to move the pivot nut 102 from the second position to the first position. In other embodiments, the bore 132 may extend through a central portion of the cylindrical portion 128 and the bore 132 extends through the cylindrical portion 128 into the body 110.

In some embodiments, the cylindrical portion 128 and the bore 132 may be arranged on the fifth side 130 adjacent the first side 120. Referring to FIG. 3, in other embodiments, the cylindrical portion 128 and the bore 132 may be arranged on the fifth side 130 adjacent the fourth side 126.

Referring to FIG. 4, in some embodiments, the body 110 may include a sixth side 136 opposite the fifth side 130. Further, in some embodiments, the body 110 between the fourth side 126 and the sixth side 136 may be substantially rounded. Accordingly, in some embodiments, the portion of the body 110 between the fourth side 126 and the sixth side 136 may not include an edge. In some embodiments, the pivot nut 102 may further include a bore 178 located on the sixth side 136. The bore 178 may serve as a sight hole to enable a user to observe that the threaded rod 108 extends through the bore 112 past the bore 178.

In some embodiments, the body 110 includes one or more recessed portions 134. The one or more recessed portions 134 reduces a volume of the pivot nut 102, thereby reducing an amount of raw materials needed to form the pivot nut 102. In some embodiments, the body 110 may include a recessed portion located at the rounded portion between the first side 120 and the fifth side 130. In another embodiments, the body 110 may include a recessed portion located at the rounded portion between the fourth side 126 and the sixth side 136.

Figure 5:
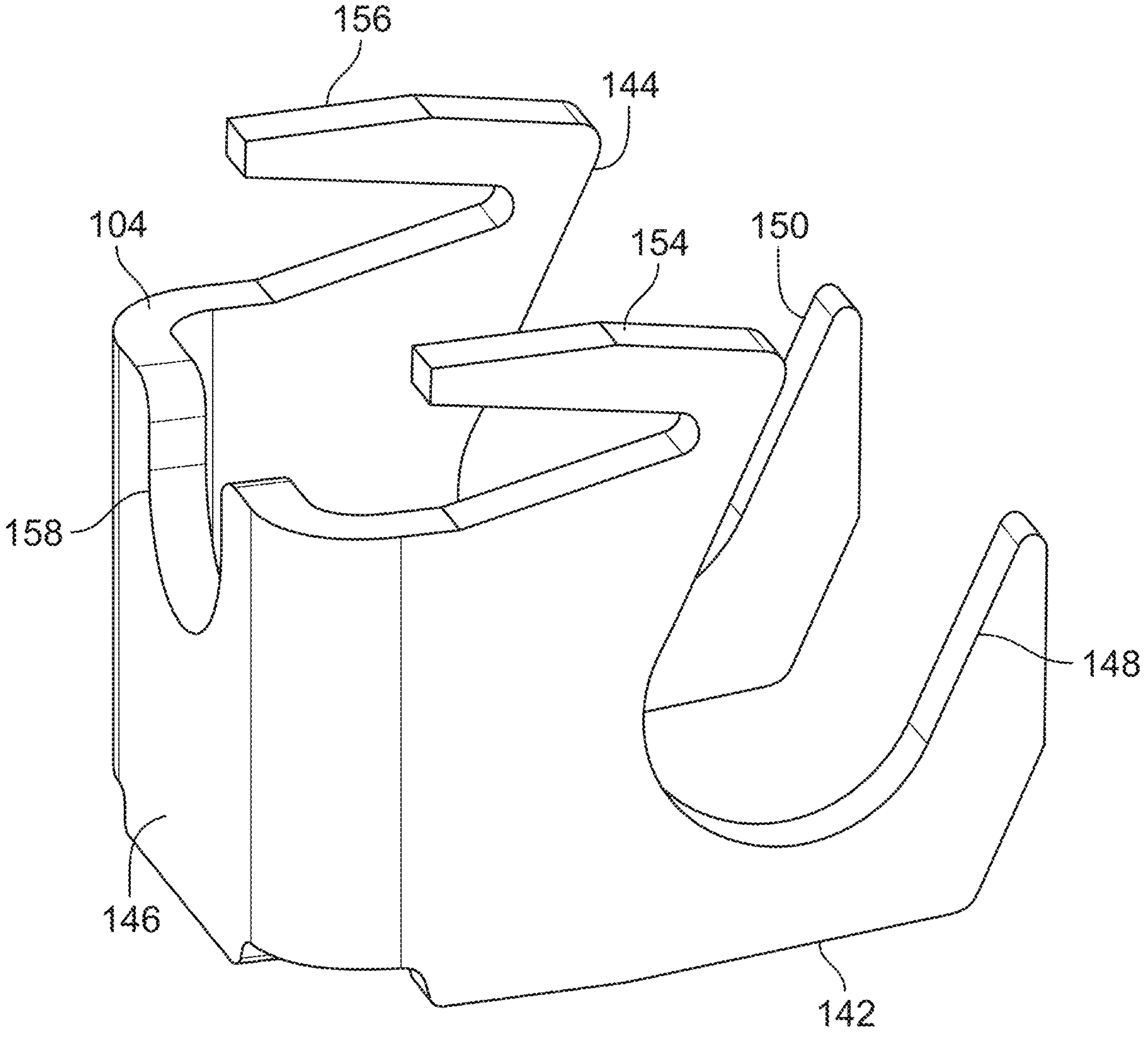
FIG. 5 illustrates a perspective view of a non-limiting example of a retainer, according to some embodiments.

FIG. 5 illustrates a perspective view of a non-limiting example of a retainer 104, according to some embodiments. The retainer 104 includes a first portion 142, a second portion 144, and a central portion 146. The first portion 142 and the second portion 144 extend from opposite sides of the central portion 146. Additionally, in some embodiments, the first portion 142 and the second portion 144 extend from the central portion 146 in a common direction that is substantially perpendicular to the direction of the central portion 146. In some embodiments, the first portion 142 and the second portion 144 may extend in directions that are substantially parallel. In other embodiments, the first portion 142 and the second portion 144 may angularly extend from the central portion 146 such that the distance between the first portion 142 and the second portion 144 increases as the first portion 142 and the second portion 144 extend from the central portion 146.

The retainer 104 is configured to receive the pivot nut 102. Accordingly, in some embodiments, the retainer 104 may be configured to retain the pivot nut 102 in the retainer 104. In some embodiments, the retainer 140 includes a first groove 148 and a second groove 150. The first groove 148 is located in the first portion 142 and the second groove 150 is located in the second portion 144. Additionally, the pivot nut 102 is installed into the retainer 104, the pivot member 114 may be positioned to extend through the first groove 148 and the pivot member 116 may be positioned to extend through the second groove 150. Furthermore, the pivot nut 102 may pivot about the pivot axis in the first groove 148 and the second groove 150.

As shown in FIG. 5, in some embodiments, the first groove 148 and the second groove 150 may extend from a top edge of the first portion 142 and the second portion 144 at the distal end and the first groove 148 and the second groove 150 may angularly extend in a downward direction towards the central portion 146. Accordingly, in some embodiments, the distal end of the first portion 142 and the second portion 144 opposite the central portion 146 may extend in an upward direction to retain the pivot nut 102 in the first groove 148 and the second groove 150. Moreover, when installed into the strut member 106, the profile of the first groove 148 and the second groove 150 in the first portion 142 and the second portion 144, respectively, retains the pivot nut 102 in the retainer 104.

Figure 9:
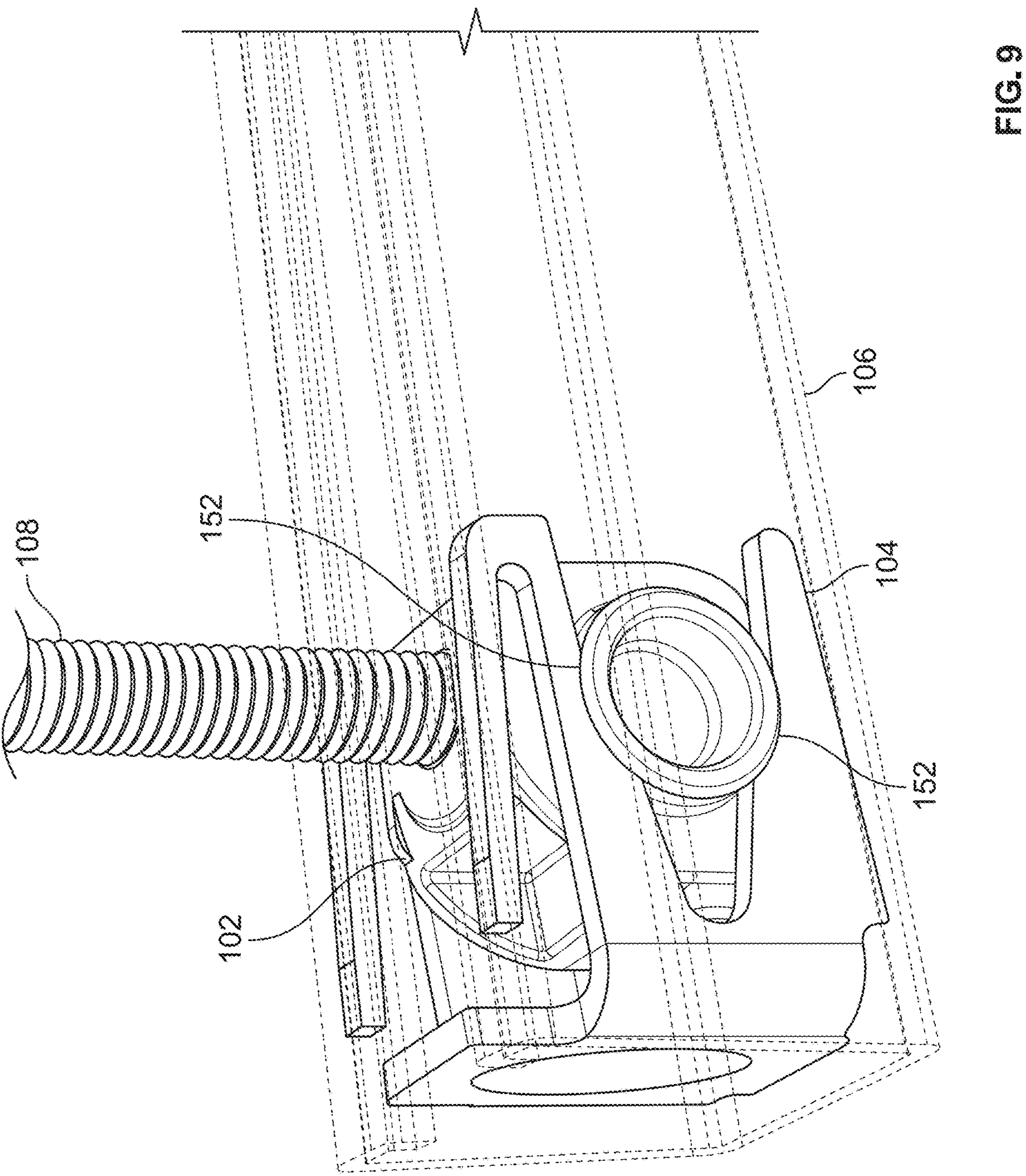
FIG. 9 illustrates a partially exposed perspective view of the system, according to some embodiments.

In some embodiments, the first groove 148 and the second groove 150 may be horizontally aligned, such as shown in FIG. 9. In some embodiments, the size of the groove may gradually increase as the groove extends towards the distal end from the central portion 146. In some embodiments, each of the first groove 148 and the second groove 150 may further include an arcuate cutout 152, the shape substantially corresponding to the pivot member 114 and the pivot member 116 to enable the pivot nut 102 to be positioned in the first groove 148 and the second groove 150 and the retainer 104 being configured to retain the pivot nut 102 in the retainer 104.

In some embodiments, the first groove 148 and the second groove 150 may be apertures that extend through the first portion 142 and the second portion 144, respectively. The pivot member 114 and the pivot member 116 may extend through the apertures and the first portion 142 and the second portion 144 may then retain the position of the pivot nut 102 in the retainer 104.

In some embodiments, the retainer 104 may further include a tension element 154 located on the first portion 142 and a tension element 156 located on the second portion 144. The tension element 154 and the tension element 156 are configured to apply a spring force onto the open channel of the strut member 106 to retain the retainer 104 in the strut member 106 as will be further described herein. In some embodiments, the tension element 154 and the tension element 156 may apply adequate force onto the interior surfaces of the channel of the strut member 106 to restrict a movement of the retainer 104 in the axial direction along a longitudinal length of the strut member 106.

In some embodiments, the tension element 154 and the tension element 156 may be integrally formed from the first portion 142 and the second portion 144, respectively. In some embodiments, the tension element 154 and the tension element 156 may be a spring element. In some embodiments, the tension element 154 and the tension element 156 may be a leaf spring. In other embodiments, the tension element 154 and the tension element 156 may be a cantilever spring. It is to be appreciated by those having ordinary skill in the art that the type of spring of the tension element 154 and the tension element 156 is not intended to be limiting and may include any of a plurality of spring types capable of acting in concert with the first portion 142 and the second portion 144 to apply a spring force onto the strut member 106 in accordance with this disclosure.

In some embodiments, the retainer 104 may further include a groove 158 located on the central portion 146. In some embodiments, the groove 158 extends from an upper portion of the central portion 146 and towards a downward direction. The groove 158 is configured to align with the cylindrical portion 128 and the bore 132 to enable the elongated article to extend into the bore 132 and to enable the elongated article to pivot the pivot nut 102 from the first position towards the second position when the pivot nut 102 is installed into the retainer 104 and the pivot nut 102 and the retainer 104 are installed into the strut member 106.

In some embodiments, the retainer 104 may further include detents on each of the first portion 142 and the second portion 144. In some embodiments, the detents may protrude from an exterior surface of the first portion 142 and the second portion 144. The detents are configured to act on the opposing sidewalls of the open channel of the strut member 106 to retain the retainer 104 in the strut member 106. In other embodiments, the retainer 104 may further include a punch-out spring formed by the first portion 142 and the second portion 144. The punch-out spring includes a tension element that protrudes outward from the plane of the surface of the first portion 142 and the second portion 144, respectively, and is configured to apply a contact force onto opposing sidewalls of the open channel of the strut member 106 to retain the retainer 104 in the strut member 106.

Figure 6:
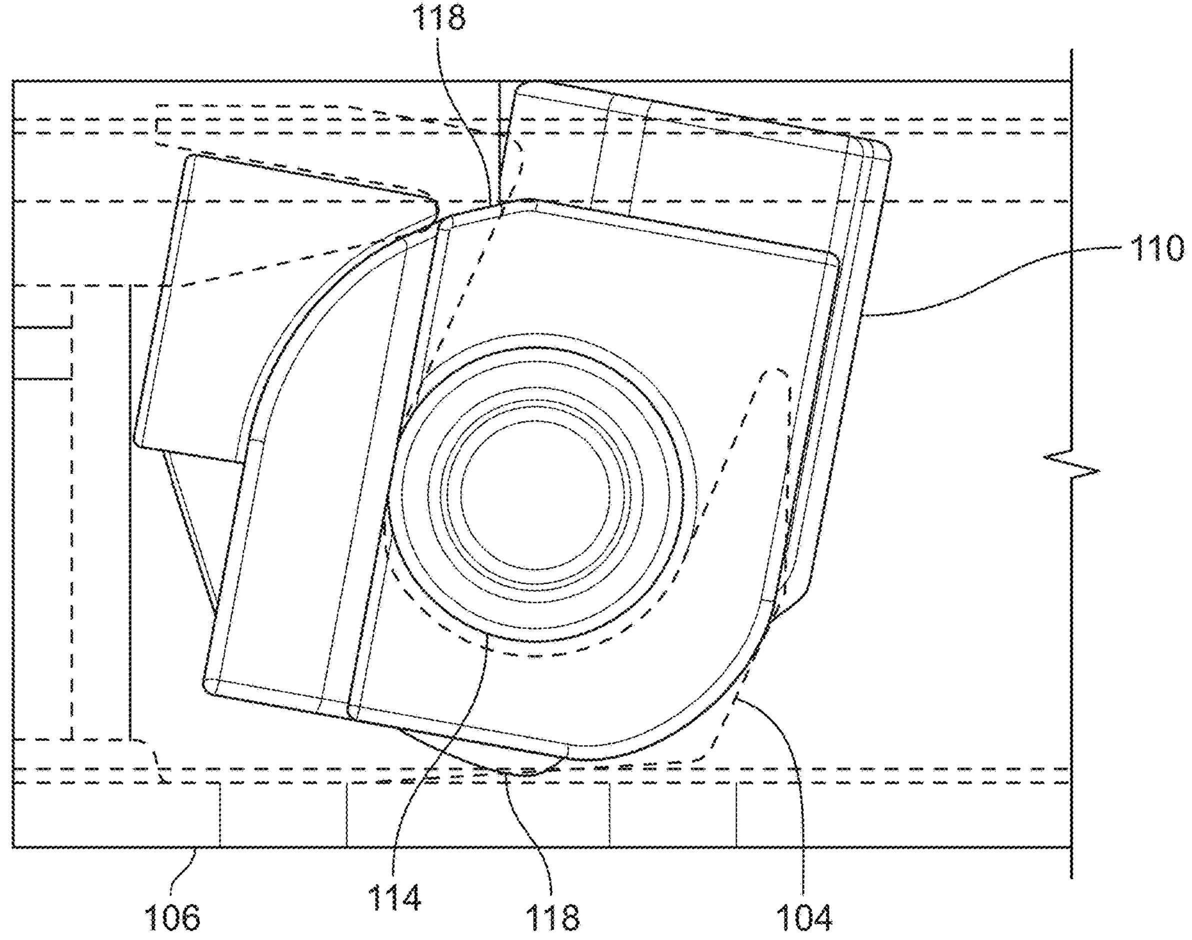
FIG. 6 illustrates a partially exposed side view of the system, according to some embodiments.

FIG. 6 illustrates a partially exposed side view of the system 100, according to some embodiments.

The pivot nut 102 and the retainer 104 may be installed into the strut member 106 adjacent an end of the strut member 106. In some embodiments, the pivot nut 102 may be first installed into the retainer 104 and the pivot nut 102 and the retainer 104 may then be installed into the strut member 106. In some embodiments, the pivot nut 102 may be movable about the pivot axis between a first position and a second position about the pivot axis. In some embodiments, the first position may include the bore 112 in horizontal alignment. In some embodiments, the axis of the bore 112 may extend along a longitudinal length of the strut member 106 in the first position. In some embodiments, the second position may include the bore 112 being in vertical alignment. In some embodiments, the axis of the bore 112 may extend in a direction that is substantially perpendicular to the longitudinal length of the strut member 106 in the second position.

The pivot nut 102 is configured to move between the first position and the second position in the strut member 106. In some embodiments, the pivot nut 102 may include one or more embossments 118 at the first side 120. In some embodiments, the one or more embossments 118 at the first side 120 may act upon the sidewalls of the strut member 106 (e.g., flanges formed at the sidewalls). Accordingly, the one or more embossments 118 at the first side 120 may act as pinch points that contacts the sidewalls of the strut member 106 and provides resistance to the movement of the pivot nut 102 between the first position and the second position about the pivot axis. Accordingly, increased leverage (e.g., force) may need to be applied to the pivot nut 102 to overcome the resistance from the one or more embossments 118 at the first side 120 and to enable the pivot nut 102 to move between the first position and the second position. Additionally, once in the second position, the one or more embossments 118 at the first side 120 may also restrict the movement of the pivot nut 102 from the second position to the first position.

In some embodiments, the pivot nut 102 include one or more embossments 118 at the fourth side 126. In some embodiments, the one or more embossments 118 at the fourth side 126 may act against a bottom surface of the strut member 106 to act as a pinch point to provide resistance to the movement of the pivot nut 102 between the first position and the second position about the pivot axis. Accordingly, increased leverage may need to be applied to the pivot nut 102 to overcome the resistance from the one or more embossments 118 at the fourth side 126 and to move the pivot nut 102 to the second position. Additionally, in the second position, the one or more embossments 118 at the fourth side 126 may continue to act against the interior surface of the strut member 106 to retain the position of the pivot nut 102 in the strut member 106. In some embodiments, the one or more embossments 118 at the first side 120 and the one or more embossments 118 at the fourth side 126 may act concurrently with the other of the one or more embossments 118 opposite the body 110 to act against opposing contact areas in the open channel to retain the position of the pivot nut 102 in the open channel of the strut member 106 and to prevent movement of the pivot nut 102 in the longitudinal direction along a length of the strut member 106. In some embodiments, the one or more embossments 118 at the fourth side 126 may include a wedge shape that protrudes from a surface of the fourth side 126.

Figure 7:
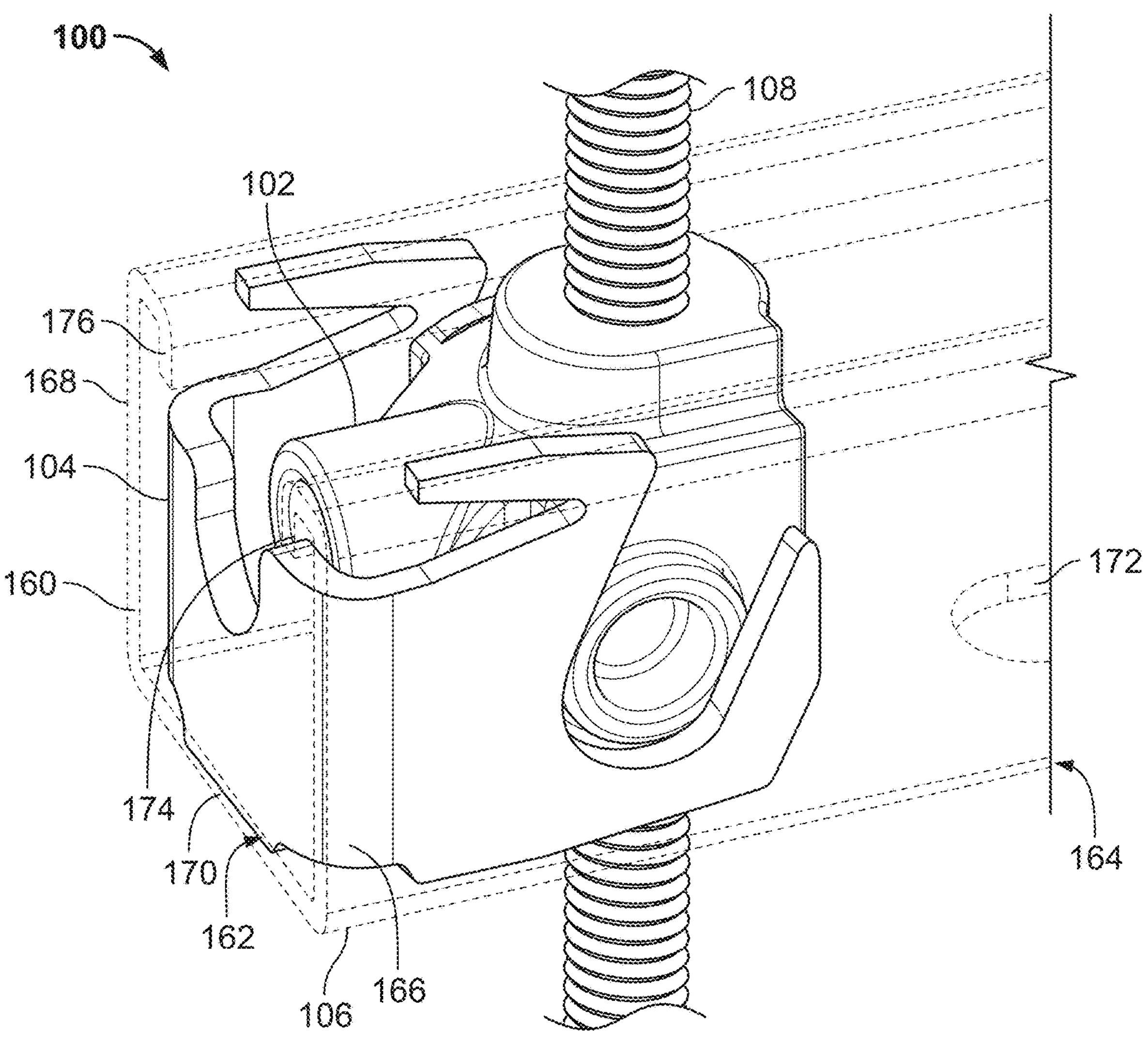
FIG. 7 illustrates a partially exposed perspective view of the system, according to some embodiments.
Figure 8:
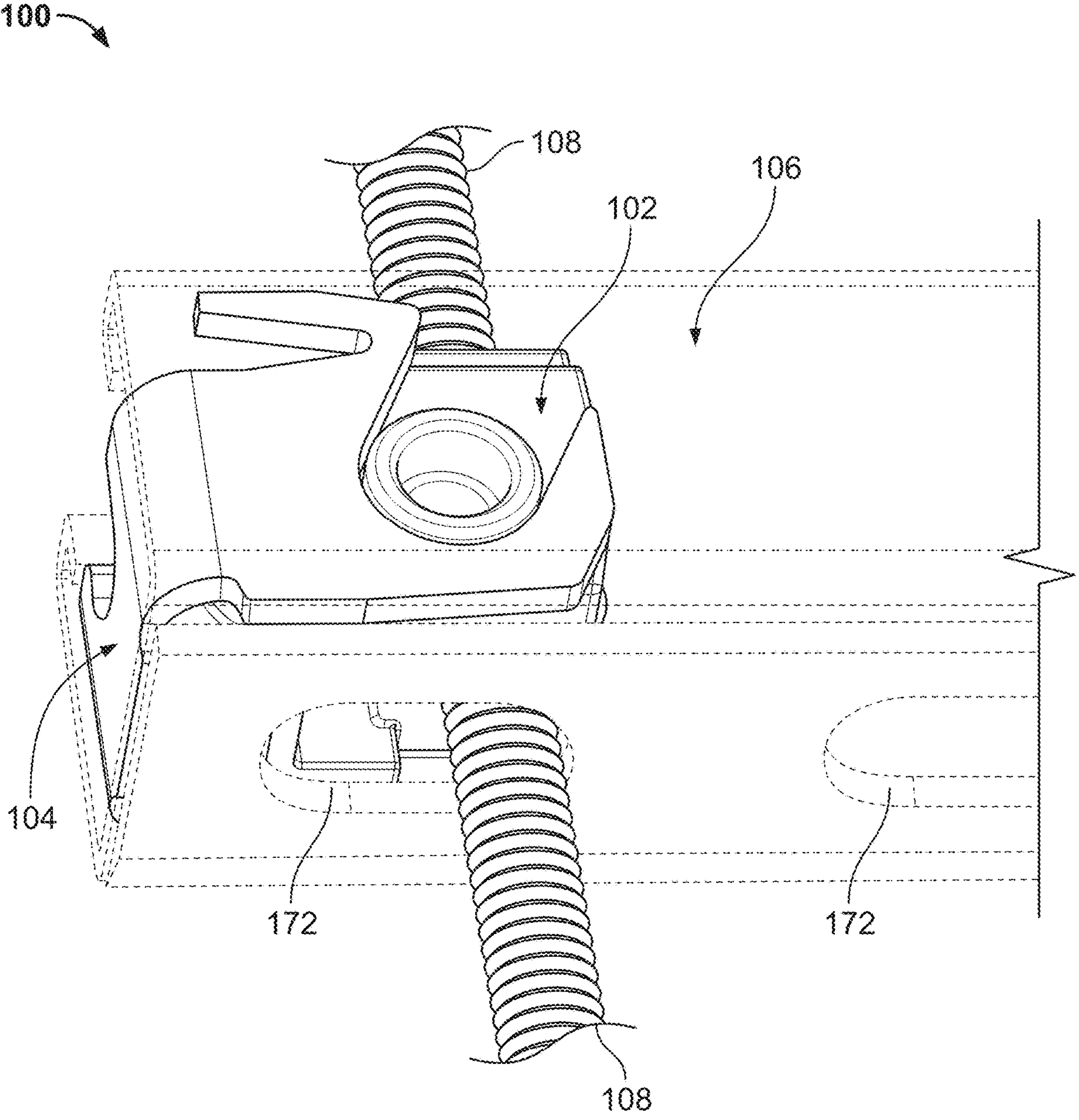
FIG. 8 illustrates a second partially exposed perspective view of the system, according to some embodiments.

FIG. 7 illustrates a partially exposed perspective view of a non-limiting example of the system 100, according to some embodiments. FIG. 8 illustrates a second partially exposed perspective view of the system 100 of FIG. 7, according to some embodiments. FIG. 9 illustrates a partially exposed perspective view of another non-limiting example of system 100, according to some embodiments. Unless specifically referenced, FIGS. 7-9 will be described collectively.

The strut member 106 includes a first end 162 and a second end 164 opposite the first end 162. Additionally, in some embodiments, the pivot nut 102 and retainer 104 may be configured to be installed adjacent the first end 162 and second end 164 of strut member 106 by being slidably inserted into the open channel 160 at either the first end 162 or second end 164 of the strut member 106 until the retainer 104 and pivot nut 102 pivotably movable therein are in a desired position along a longitudinal length of strut member 106.

The strut member 106 may include a first sidewall 166, a second sidewall 168, and a bottom surface 170. The first sidewall 166, second sidewall 168, and bottom surface 170 define an open channel 160 of the strut member 106. In some embodiments, the first sidewall 166 and the second sidewall 168 extend in a common direction that is substantially perpendicular to the direction of the bottom surface 170 to form the open channel 160. Accordingly, the first sidewall 166, second sidewall 168, and bottom surface 170 may form a u-shaped channel that longitudinally extends the length of the strut member 106. In some embodiments, the first sidewall 166 and second sidewall 168 may angularly extend outward from the bottom surface 170 such that a distance between the first sidewall 166 and the second sidewall 168 increases as the first sidewall 166 and second sidewall 168 extend from bottom surface 170 and towards a distal end opposite the bottom surface 170. In some embodiments, the strut member 106 may be formed from metallic materials and may include sufficient structural rigidity to be substantially resistant to deformation. In other embodiments, the strut member 106 may be formed from non-conductive materials and may including a specific structural rigidity to be able to withstand deformation in response to bending forces. For example, in some embodiments, the strut member 106 may be formed from any of a plurality of metallic materials including, but not limited to, steel, stainless steel, iron, metal alloys, other metals, or any combinations thereof. In another example, the strut member 106 may be formed from plastic, thermoplastic, resins, polymers, binders, fillers, additives, epoxies, other materials, or any combination thereof.

In some embodiments, the pivot nut 102 and the retainer 104 may be installed into the open channel 160 between the first sidewall 166 and the second sidewall 168. In some embodiments, the pivot nut 102 and the retainer 104 may be installed into the strut member 106 between the first sidewall 166 and second sidewall 168 such that the pivot nut 102 and a direction of the bore 112 is horizontally aligned.

In some embodiments, the strut member 106 may further include a first flange 174 and a second flange 176. The first flange 174 may be connected to the first sidewall 166 along a longitudinal end of the first sidewall 166 opposite the bottom surface 170, and the second flange 176 may be connected to the second sidewall 168 along a longitudinal end of the second sidewall 168 opposite the bottom surface 170. In some embodiments, the first flange 174 may extend from the first sidewall 166 and the second flange 176 may extend from the second sidewall 168. Accordingly, in certain embodiments, the first flange 174 and the second flange 176 may be formed from the rolled over longitudinally extending ends of the first sidewall 166 and the second sidewall 168.

In some embodiments, the retainer 104 may be installed into the open channel 160 such that the first portion 142 is positioned between the first sidewall 166 and the first flange 174 and the second portion 144 is positioned between the second sidewall 168 and the second flange 176. Accordingly, in some embodiments, when installed into the open channel 160 of the strut member 106, the tension element 154 may act upon the interior surface between the first sidewall 166 and the first flange 174 and the tension element 156 may act upon the interior surface between the second sidewall 168 and the second flange 176.

In some embodiments, the system 100 may include the threaded rod 108 in connection with the pivot nut 102. The pivot nut 102 is configured to receive the threaded rod 108 at the bore 112. In some embodiments, the bore 112 may include a threaded inner surface configured to engage the threads of the threaded rod 108 to enable the threaded rod 108 to extend through the bore 112. In some embodiments, the bore 112 may include one or more threads formed on an inner surface of the bore 112 and the threaded rod 108 may also include one or more threads formed thereon. Accordingly, the one or more threads of the bore 112 may engage the one or more threads of the bore 112 to enable the threaded rod 108 to connect to the pivot nut 102.

Referring to FIG. 8, in some embodiments, the strut member 106 may include one or more slots 172. The one or more slots 172 may be arranged on the bottom surface 170 of the strut member 106. Additionally, in some embodiments, the one or more slots 172 may extend in a longitudinal direction on the bottom surface 170 between the first end 162 and second end 164. In some embodiments, when installed into the strut member 106, the pivot nut 102 and the retainer 104 may be positioned in the open channel 160 to enable the bore 112 to be in substantially colinear alignment with a slot of the one or more slots 172 when the pivot nut 102 is in the second position. Accordingly, in some embodiments, the pivot nut 102 may be moved from the first horizontally aligned position to the second vertically aligned position to enable a threaded rod 108 in connection with the pivot nut 102 to extend through the pivot nut 102 at the bore 112 and for the threaded rod 108 to extend through the slot of the one or more slots 172 that is in colinear alignment with the bore 112. Additionally, a position of a corresponding end (e.g., first end 162 or second end 164) of the strut member 106 may be adjusted in the axial direction along the length of the respective threaded rod 108 that extends through the pivot nut 102 by rotating the threaded rod 108 in the bore 112 of the respective pivot nut 102.

Figure 10:
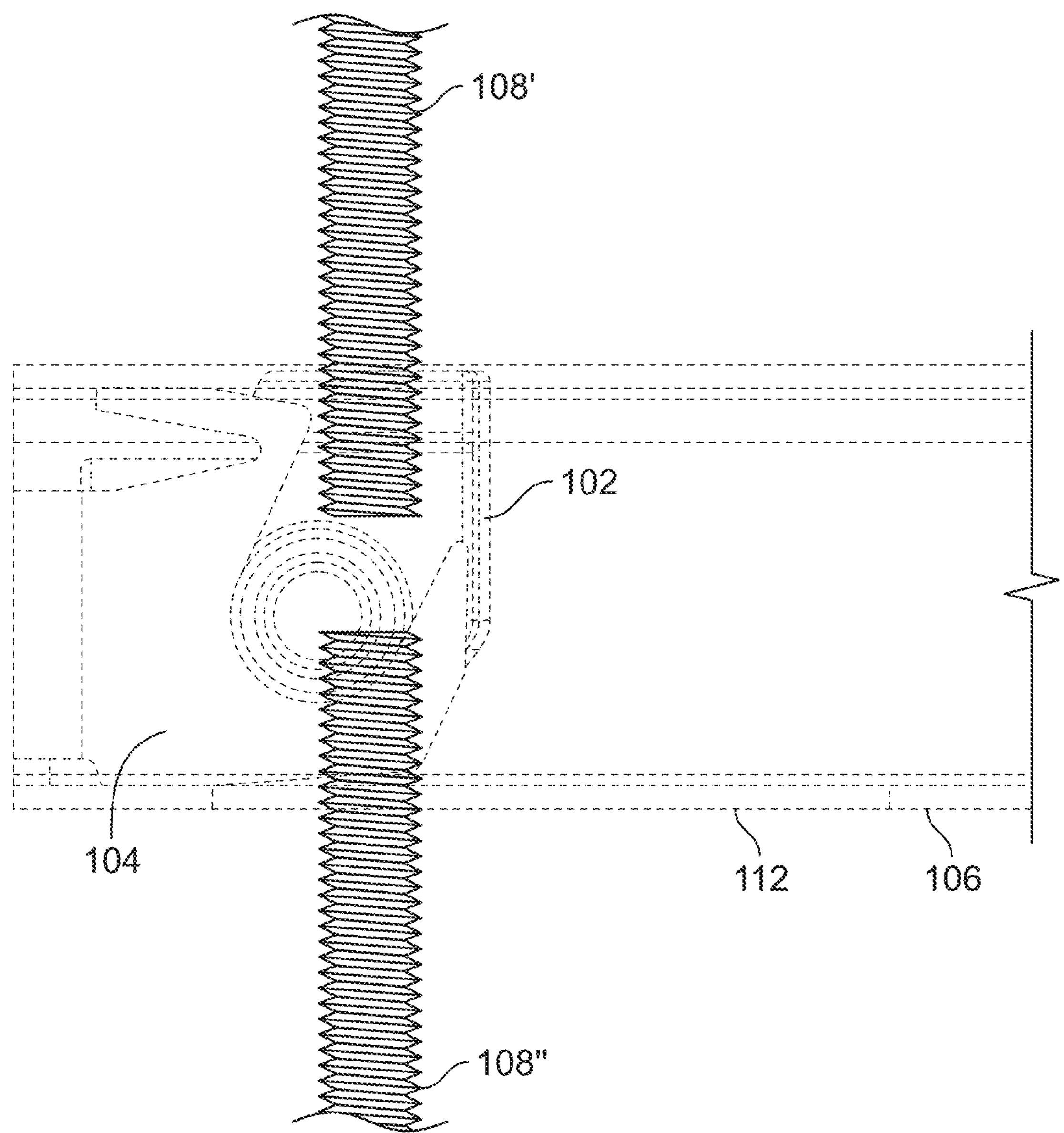
FIG. 10 illustrates a partially exposed side view of the system, according to some embodiments.

FIG. 10 illustrates an exposed side view of the system 100, according to some embodiments. In some embodiments, the bore 112 may include one or more threads on the inner surface. In some embodiments, the threads of the bore 112 may continuously extend between the first side 120 and the fourth side 126. Accordingly, in some embodiments, a threaded rod 108 may be extend through the bore 112 of pivot nut 102. In other embodiments, the pivot nut 102 may receive a first threaded rod 108' in the bore 112 at the first side 120 and a second threaded rod 108" in the bore 112 at the fourth side 126. In some embodiments, the bore 112 may include a first threaded surface adjacent the first side 120 and a second threaded surface adjacent the fourth side 126. Accordingly, in some embodiments, the pivot nut 102 may be configured receive a first threaded rod 108' in the first threaded surface of bore 112 at the first side 120 and the pivot nut 102 may also be configured to receive a second threaded bore 108" in the second threaded surface of bore 112 at the fourth side 126. In this regard, one or more of system 100 may depend from the structural member and/or another system 100. For example, three of the system 100 may vertically depend from the structural member. Accordingly, in some embodiments, system 100 may be in connection with other system 100 and/or the structural member and depend therefrom to provide multiple levels for elongate articles to traverse at different levels.

In some embodiments, the system 100 may be in connected with one or more other system 100. For example, a first system 100' may be connected to a structural member and a second system 100" may be configured to connect to the first system 100' by threading the end of each threaded rod 108 opposite the pivot nut 102 from the second system 100" into the bore 112 at the fourth side 126 of the pivot nut 102 of the first system 100'. Accordingly, a plurality of the system 100 may be connected in series to form two or more levels for conduits, pipes, electrical cables, or the like to extend through the facility at different levels.

In some embodiments, the pivot nut 102 may include a bore at the first side 120 and a bore at the fourth side 126 opposite the first side. In some embodiments, the bore at the first side 120 may be in communication with the bore at the fourth side 126. In some embodiments, the bore at the first side 120 may not be in communication with the bore at the fourth side 126. Accordingly, in some embodiments, a first threaded rod 108' may be in connection with pivot nut 102 at the bore at the first side 120 and a second threaded rod 108" may be in connection with the pivot nut 102 at the bore at the fourth side 126. In other embodiments, the bore 112 may include one or more threaded inserts (not shown) located in the bore 112 and configured to engage the threads of the threaded rod to couple the pivot nut 102 to the threaded rod 108.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "between" does not necessarily require being disposed directly next to other elements. Generally, this term means a configuration where something is sandwiched by two or more other things. At the same time, the term "between" can describe something that is directly next to two opposing things.

Accordingly, in any one or more of the embodiments disclosed herein, a particular structural component being disposed between two other structural elements can be:

- disposed directly between both of the two other structural elements such that the particular structural component is in direct contact with both of the two other structural elements;
- disposed directly next to only one of the two other structural elements such that the particular structural component is in direct contact with only one of the two other structural elements;
- disposed indirectly next to only one of the two other structural elements such that the particular structural component is not in direct contact with only one of the two other structural elements, and there is another element which juxtaposes the particular structural component and the one of the two other structural elements;
- disposed indirectly between both of the two other structural elements such that the particular structural component is not in direct contact with both of the two other structural elements, and other features can be disposed therebetween; or any combination(s) thereof.

As used herein "embedded" means that a first material is distributed throughout a second material.

Aspects

Various Aspects are described below. It is to be understood that any one or more of the features recited in the following Aspect(s) can be combined with any one or more other Aspect(s).

Aspect 1. An assembly comprising: a pivot nut defined by a body, the pivot nut comprising: a first bore at a first side, a first pivot member at a second side, a second pivot member at a third side, and one or more embossments, wherein the first pivot member and the second pivot member define a pivot axis; a retainer comprising: a first portion, a second portion, a central portion, a first groove at the first portion, and a second groove at the second portion, wherein the first portion and the second portion extend from opposing sides of the central portion in a common direction substantially perpendicular to the central portion; wherein the first pivot member extends into the first groove and the second pivot member extends into the second groove and the pivot nut is configured to move about the pivot axis between a first position and a second position; and wherein the first bore is in a horizontal alignment in the first position and the first bore is in a vertical alignment in the second position.

Aspect 2. The assembly according to aspect 1, further comprising: a strut member comprising: a first end, a second end, a bottom surface, a first sidewall, wherein the first sidewall includes a first flange formed on a longitudinal side of the first sidewall opposite the bottom surface, and a second sidewall, wherein the second sidewall includes a second flange formed on a longitudinal side of the second sidewall opposite the bottom surface, wherein the first sidewall and the second sidewall extend from opposite sides of the bottom surface in a common direction substantially perpendicular to a direction of the bottom surface; wherein the pivot nut and the retainer are configured to be installed into the open channel.

Aspect 3. The assembly according to aspect 2, further comprising: a threaded rod, wherein the threaded rod is configured to couple to the pivot nut by engaging one or more threads at the first bore and a position of the threaded rod is adjustable in an axial direction by threading the threaded rod in a clockwise or counterclockwise direction in the first bore, wherein the threaded rod longitudinally extends through the open channel towards an opposite end when the pivot nut is in the first position.

Aspect 4. The assembly according to aspects 2 or 3, wherein the strut member further comprises: one or more slots, wherein the one or more slots are longitudinally arranged on the bottom surface between the first end and the second end.

Aspect 5, The assembly according to aspects 2, 3, or 4, wherein the threaded rod is configured to adjustably extend through the first bore and the one or more slots.

Aspect 6. The assembly according to aspects 2, 3, 4, or 5, wherein the one or more embossments comprises: one or more first embossments at the first side, wherein the one or more first embossments and the body of the pivot nut apply a locking force between opposing contact surfaces in the open channel when moving between the first position and the second position to retain the pivot nut in the second position.

Aspect 7. The assembly according to aspects 2, 3, 4, 5, or 6, wherein the one or more embossments further comprises: one or more second embossments at a fourth side, wherein the one or more first embossments and the one or more second embossments act on opposing contact surfaces in the open channel of the strut member when moving between the first position and the second position to retain the pivot nut in the second position.

Aspect 8. The assembly according to aspects 2, 3, 4, 5, 6, or 7, wherein the retainer further comprises: a first tension element, wherein the first tension element is located at the first portion; a second tension element, wherein the second tension element is located at the second portion; and wherein the first tension element and the second tension element are configured to apply a spring force between opposing interior surfaces of the open channel of the strut member to retain a position of the retainer and the pivot nut in a longitudinal direction in the strut member.

Aspect 9. The assembly according to any of the preceding aspects, wherein the pivot nut further comprises at least one of: a third protrusion at a fifth side, and a second bore at the fifth side, wherein the second bore extends into the body in a direction that is substantially perpendicular to the first bore and defines a socket configured to receive an elongate member operable by a user to pivot the pivot nut about the pivot axis.

Aspect 10. The assembly according to aspect 9, wherein the retainer further comprises: a third groove, wherein the third groove is located at the central portion and the third groove is configured to enable an elongated article to extend through the third groove into a socket of the pivot nut to enable the elongated article to pivot the pivot nut between the first position and the second position.

Aspect 11. The assembly according to aspects 3, 4, 5, 6, 7, 8, 9, or 10, wherein the pivot nut comprises a first pivot nut and a second pivot nut; wherein the retainer comprises a first retainer and a second retainer; and wherein the threaded rod comprises a first threaded rod and a second threaded rod, wherein the first pivot nut and the first retainer are located in the open channel adjacent the first end of the strut member and the second pivot nut and the second retainer are located in the open channel adjacent the second end of the strut member, wherein the first threaded rod is coupled to the first pivot nut and the second threaded rod is coupled to the second pivot nut, and the first threaded rod and the second threaded rod are horizontally aligned in the first position and the first threaded rod and the second threaded rod are vertically aligned in the second position.

Aspect 12. A pivot nut for use in a pivot channel assembly, the pivot nut comprising: a body comprising: a first pivot member at a first side, a second pivot member at a second side, a first bore, wherein the first bore extends through the body between the first pivot member and the second pivot member and extends in a first direction between a third side and a fourth side, wherein the first bore includes one or more threads formed on an inner surface, and one or more embossments, wherein the first pivot member and the second pivot member define a pivot axis and the pivot nut is configured to rotate about the pivot axis between a first position and a second position; wherein a threaded rod is configured to couple to the pivot nut by engaging the one or more threads at the first bore and a position of the threaded rod is adjustable in an axial direction by threading the threaded rod in a clockwise or counterclockwise direction in the first bore.

Aspect 13. The pivot nut according to aspect 12, wherein the pivot nut further comprises at least one of: a third protrusion at a fifth side, and a second bore at the fifth side, wherein the second bore extends into the body in a direction that is substantially perpendicular to the first bore and defines a socket configured to receive an elongate member operable by a user to pivot the pivot nut about the pivot axis.

Aspect 14. The pivot nut according to aspects 12 or 13, wherein the one or more embossments is configured to retain the pivot nut in the second position when the pivot nut is installed into a strut member; wherein the first bore is in a horizontal alignment in the first position and the first bore is in a vertical alignment in the second position.

Aspect 15. The pivot nut according to aspects 12, 13, or 14, wherein the one or more embossments comprises: one or more first embossments at the first side, wherein the one or more first embossments and the body of the pivot nut are configured to act on opposing interior surfaces of an open channel of the strut member to retain the pivot nut in the second position.

Aspect 16. The pivot nut according to aspects 12, 13, 14, or 15, wherein the one or more embossments further comprises: one or more second embossments at the fourth side, wherein the one or more first embossments and the one or more second embossments are configured to act on opposing interior surfaces of the open channel of the strut member to retain the pivot nut in the second position.

Aspect 17. A retainer for use in a pivot channel assembly, the retainer comprising: a first portion, a second portion, a central portion, a first groove, wherein the first groove is located at the first portion, a second groove, wherein the second groove is located at the second portion, and wherein the first portion and the second portion extend from opposing sides of the central portion in a common direction substantially perpendicular to the central portion; and wherein the retainer is configured to receive a pivot nut between the first portion and the second portion and the retainer is further configured to retain a position of the pivot nut in an open channel of a strut member in a longitudinal direction of the open channel.

Aspect 18. The retainer according to aspect 17, further comprising: a first tension element, wherein the first tension element is located at the first portion; a second tension element, wherein the second tension element is located at the second portion; and wherein the first tension element and the second tension element are configured to apply a spring force between opposing interior surfaces of the open channel of the strut member to retain a position of the retainer in the open channel of the strut member in the longitudinal direction.

Aspect 19. The retainer according to aspect 18, wherein the first tension element and the second tension element comprises at least one of: a leaf spring, and a cantilever spring.

Aspect 20. The retainer according to aspects 17, 18, or 19, further comprising: a third groove, wherein the third groove is located at the central portion and the third groove is configured to enable an elongated article to extend through the third groove into a socket of the pivot nut to enable the elongated article to pivot the pivot nut between a first position and a second position.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. An assembly comprising:

a pivot nut defined by a body, the pivot nut comprising:

a first bore at a first side, a first pivot member at a second side, a second pivot member at a third side, and one or more embossments, wherein the first pivot member and the second pivot member define a pivot axis;

a retainer comprising:

a first portion, a second portion, a central portion, a first groove at the first portion, and a second groove at the second portion, wherein the first portion and the second portion extend from opposing sides of the central portion in a common direction substantially perpendicular to the central portion;

wherein the first pivot member extends into the first groove and the second pivot member extends into the second groove and the pivot nut is configured to move about the pivot axis between a first position and a second position; and wherein the first bore is in a horizontal alignment in the first position and the first bore is in a vertical alignment in the second position.

2. The assembly according to claim 1, further comprising:

a strut member comprising:

a first end, a second end, a bottom surface, a first sidewall, wherein the first sidewall includes a first flange formed on a longitudinal side of the first sidewall opposite the bottom surface, and a second sidewall, wherein the second sidewall includes a second flange formed on a longitudinal side of the second sidewall opposite the bottom surface, wherein the first sidewall and the second sidewall extend from opposite sides of the bottom surface in a common direction substantially perpendicular to a direction of the bottom surface;

wherein the pivot nut and the retainer are configured to be installed into the open channel.

3. The assembly according to claim 2, further comprising:

a threaded rod, wherein the threaded rod is configured to couple to the pivot nut by engaging one or more threads at the first bore and a position of the threaded rod is adjustable in an axial direction by threading the threaded rod in a clockwise or counterclockwise direction in the first bore, wherein the threaded rod longitudinally extends through the open channel towards an opposite end when the pivot nut is in the first position.

4. The assembly according to claim 3, wherein the strut member further comprises:

one or more slots, wherein the one or more slots are longitudinally arranged on the bottom surface between the first end and the second end.

5. The assembly according to claim 4, wherein the threaded rod is further configured to adjustably extend through the first bore and the one or more slots.

6. The assembly according to claim 2, wherein the one or more embossments comprises:

one or more first embossments at the first side, wherein the one or more first embossments and the body of the pivot nut apply a locking force between opposing contact surfaces in the open channel when moving between the first position and the second position to retain the pivot nut in the second position.

7. The assembly according to claim 6, wherein the one or more embossments further comprises:

one or more second embossments at a fourth side, wherein the one or more first embossments and the one or more second embossments act on opposing contact surfaces in the open channel of the strut member when moving between the first position and the second position to retain the pivot nut in the second position.

8. The assembly according to claim 2, wherein the retainer further comprises:

a first tension element, wherein the first tension element is located at the first portion;

a second tension element, wherein the second tension element is located at the second portion; and wherein the first tension element and the second tension element are configured to apply a spring force between opposing interior surfaces of the open channel of the strut member to retain a position of the retainer and the pivot nut in a longitudinal direction in the strut member.

9. The assembly according to claim 1, wherein the pivot nut further comprises at least one of:

a third protrusion at a fifth side, and a second bore at the fifth side, wherein the second bore extends into the body in a direction that is substantially perpendicular to the first bore and defines a socket configured to receive an elongate member operable by a user to pivot the pivot nut about the pivot axis.

10. The assembly according to claim 9, wherein the retainer further comprises:

a third groove, wherein the third groove is located at the central portion and the third groove is configured to enable an elongate article to extend through the third groove into a socket of the pivot nut to enable the elongate article to pivot the pivot nut between the first position and the second position.

11. The assembly according to claim 3, wherein the pivot nut comprises a first pivot nut and a second pivot nut;

wherein the retainer comprises a first retainer and a second retainer; and wherein the threaded rod comprises a first threaded rod and a second threaded rod, wherein the first pivot nut and the first retainer are located in the open channel adjacent the first end of the strut member and the second pivot nut and the second retainer are located in the open channel adjacent the second end of the strut member, wherein the first threaded rod is coupled to the first pivot nut and the second threaded rod is coupled to the second pivot nut, and the first threaded rod and the second threaded rod are horizontally aligned in the first position and the first threaded rod and the second threaded rod are vertically aligned in the second position.

12. A pivot nut for use in a pivot channel assembly, the pivot nut comprising:

a body comprising:

a first pivot member at a first side, a second pivot member at a second side, a first bore, wherein the first bore extends through the body between the first pivot member and the second pivot member and extends in a first direction between a third side and a fourth side, wherein the first bore includes one or more threads formed on an inner surface, and one or more embossments, wherein the first pivot member and the second pivot member define a pivot axis and the pivot nut is configured to rotate about the pivot axis between a first position and a second position;

wherein a threaded rod is configured to couple to the pivot nut by engaging the one or more threads at the first bore and a position of the threaded rod is adjustable in an axial direction by threading the threaded rod in a clockwise or counterclockwise direction in the first bore.

13. The pivot nut according to claim 12, wherein the pivot nut further comprises at least one of:

a third protrusion at a fifth side, and a second bore at the fifth side, wherein the second bore extends into the body in a direction that is substantially perpendicular to the first bore and defines a socket configured to receive an elongate member operable by a user to pivot the pivot nut about the pivot axis.

14. The pivot nut according to claim 12, wherein the one or more embossments is configured to retain the pivot nut in the second position when the pivot nut is installed into a strut member;

wherein the first bore is in a horizontal alignment in the first position and the first bore is in a vertical alignment in the second position.

15. The pivot nut according to claim 14, wherein the one or more embossments comprises:

one or more first embossments at the first side, wherein the one or more first embossments and the body of the pivot nut are configured to act on opposing interior surfaces of an open channel of the strut member to retain the pivot nut in the second position.

16. The pivot nut according to claim 15, wherein the one or more embossments further comprises:

one or more second embossments at the fourth side, wherein the one or more first embossments and the one or more second embossments are configured to act on opposing interior surfaces of the open channel of the strut member to retain the pivot nut in the second position.

17. A retainer for use in a pivot channel assembly, the retainer comprising:

a first portion comprising:

a first groove, and a first tension element, a second portion comprising:

a second groove, and a second tension element, and a central portion extending between the first portion and the second portion, wherein the first portion and the second portion extend from opposing sides of the central portion in a common direction substantially perpendicular to the central portion;

wherein the retainer is configured to receive a pivot nut at the first and second grooves between the first portion and the second portion and the retainer is further configured to retain a position of the pivot nut in an open channel of a strut member in a longitudinal direction of the open channel; and wherein the first tension element and the second tension element are configured to apply a spring force between opposing interior surfaces of the open channel of the strut member to retain a position of the retainer in the open channel of the strut member in the longitudinal direction.

18. The retainer according to claim 17, wherein the first tension element and the second tension element comprise at least one of:

a leaf spring, or a cantilever spring.

19. The retainer according to claim 17, further comprising:

a third groove, wherein the third groove is located at the central portion and the third groove is configured to enable an elongate article to extend through the third groove into a socket of the pivot nut to enable the elongate article to pivot the pivot nut between a first position and a second position.

* * * * *